(12) United States Patent
Ozugur et al.

(10) Patent No.: US 7,676,577 B2
(45) Date of Patent: Mar. 9, 2010

(54) SCALABLE PRESENCE DISTRIBUTION SYSTEM AND METHOD

(75) Inventors: Timucin Ozugur, Garland, TX (US);
Aziz Mohammed, Plano, TX (US); Jack Jachner, Plano, TX (US); Fuming Wu, Frisco, TX (US)

(73) Assignee: Alcatel Lucent, Paris (FR)

( * ) Notice: Subject to any disclaimer, the term of this patent is extended or adjusted under 35 U.S.C. 154(b) by 231 days.

(21) Appl. No.: 11/019,560

(22) Filed: Dec. 21, 2004

(65) Prior Publication Data
US 2006/0167978 A1 Jul. 27, 2006

(51) Int. Cl.
*G06F 15/173* (2006.01)
*G06F 15/16* (2006.01)

(52) U.S. Cl. .............. 709/226; 709/232; 709/235; 709/238

(58) Field of Classification Search .............. 709/226, 709/232, 235, 238–242
See application file for complete search history.

(56) References Cited

U.S. PATENT DOCUMENTS

| | | | | |
|---|---|---|---|---|
| 6,070,191 | A * | 5/2000 | Narendran et al. | 709/226 |
| 6,405,252 | B1 * | 6/2002 | Gupta et al. | 709/224 |
| 2003/0009530 | A1 * | 1/2003 | Philonenko et al. | 709/206 |
| 2003/0108000 | A1 | 6/2003 | Chaney et al. | |
| 2003/0108002 | A1 * | 6/2003 | Chaney et al. | 370/261 |
| 2004/0114578 | A1 * | 6/2004 | Soncodi et al. | 370/352 |
| 2004/0122901 | A1 | 6/2004 | Sylvain | |
| 2004/0133641 | A1 * | 7/2004 | McKinnon et al. | 709/204 |
| 2004/0158608 | A1 | 8/2004 | Friedman | |
| 2005/0033858 | A1 * | 2/2005 | Swildens et al. | 709/232 |
| 2005/0251557 | A1 * | 11/2005 | Yoshizawa et al. | 709/206 |
| 2006/0058025 | A1 * | 3/2006 | Barrow | 455/433 |

FOREIGN PATENT DOCUMENTS

| | | |
|---|---|---|
| WO | WO 02/096128 | 11/2002 |
| WO | 03069364 A2 | 8/2003 |
| WO | WO 03/094011 | 11/2003 |

OTHER PUBLICATIONS

Day et al.; "A Model for Presence and Instant Messaging"; Network Working Group; Feb. 2000; pp. 1-17.
Day et al.; "Instant Messaging / Present Protocol Requirements"; Network Working Group; Feb. 2000; pp. 1-26.
Phifer; "Establishing Geographically-Distributed, High-Availability Internet Presence with Coyote Point Envoy"; Coyote Point Systems, Inc.; Feb. 14, 2000; 5 pages.
Schulzrinne et al.; "RPIDS—Rich Presence Information Data Format for Presence Based on the Session Initiation Protocol (SIP)"; Internet Engineering Task Force; Feb. 18, 2003; pp. 1-16.

\* cited by examiner

*Primary Examiner*—Krisna Lim
*Assistant Examiner*—Philip J Chea
(74) *Attorney, Agent, or Firm*—Garlick Harrison & Markison

(57) ABSTRACT

Scalable presence distribution system and method are described. In one embodiment, a presence distribution system comprises a plurality of presence servers and a centralized management function for coordinating registration of a presentity with one or more of the plurality of presence servers.

17 Claims, 7 Drawing Sheets

SCALABLE PRESENCE DISTRIBUTION SYSTEM AND METHOD

BACKGROUND OF THE INVENTION

1. Technical Field of the Invention

The present invention generally relates to distribution of presence information. More particularly, and not by way of any limitation, the present invention is directed to system and method for enabling scalable distribution of such presence information.

2. Description of Related Art

Presence distribution systems are currently implemented using a single presence server; that is, each presentity registers with and publishes its presence information to only one presence server. FIG. 1 illustrates such a prior art presence distribution system, which is designated in FIG. 1 by a reference numeral 100. As shown in FIG. 1, all presentities, represented by a presentity 102, in the system 100 register with a single presence server 104, as represented by an arrow 105. Similarly, all watchers, represented in FIG. 1 by a watcher 106, subscribe to one or more of the presentities 102 via the presence server 104, as represented by an arrow 107. After it is registered, the presentity 102 publishes its presence information to the server 104 when any of its attributes change, as represented by an arrow 108. The server 102, in turn, notifies the watchers, such as the watcher 106, that have subscribed to the presentity 102, as represented by an arrow 110.

The centralized presence distribution system, such as the system 100, suffers from a number of significant limitations. In particular, due to the lack of scalability inherent in the system, performance capacity will become saturated as the number of users grows. Moreover, centralization, or lack of distributed mechanisms for presence servers, results in problems for organizations with large divisions located in geographically separate areas. Finally, the system 100 lacks redundancy, which will result in users being unable to access system services should the server 104 crash or be taken down to undergo maintenance.

Therefore, what is needed is a presence distribution system that is scalable and overcomes the above-noted deficiencies of currently available systems.

SUMMARY OF THE INVENTION

One embodiment is a presence distribution system comprising a plurality of presence servers and a centralized management function for coordinating registration of a presentity with one or more of the plurality of presence servers.

Another embodiment is a method of implementing a presence distribution system. The method comprises receiving load information from a plurality of presence servers; for each presentity registered with one of the plurality of presence servers, identifying at least one of the plurality of presence servers with which the presentity should register; and for each presentity registered with one of the plurality of presence servers, directing the presentity to register with the identified at least one presence server.

Another embodiment is a presence distribution system comprising means for receiving load information from a plurality of presence servers; means for identifying, for each presentity registered with one of the plurality of presence servers, at least one of the plurality of presence servers with which the presentity should register; and means for directing each presentity registered with one of the plurality of presence servers to register with the identified at least one presence server.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
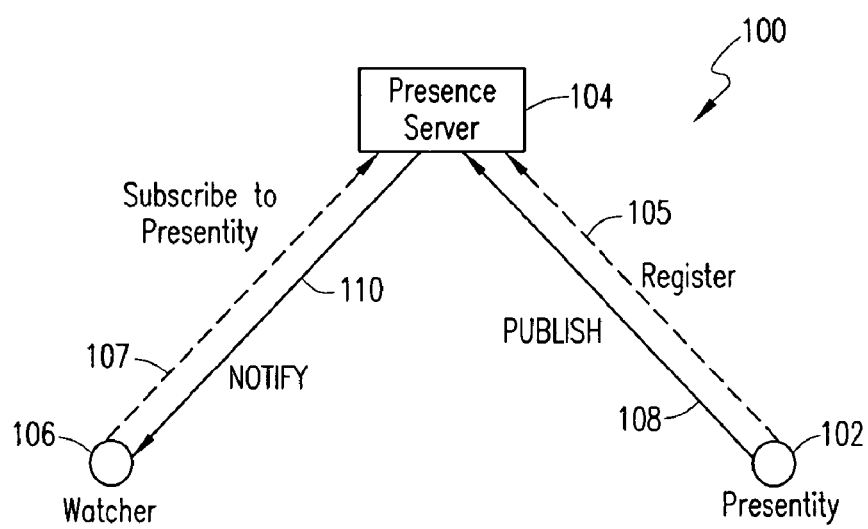
FIG. 1 illustrates a block diagram of a prior art single server presence distribution system.
Figure 2A:
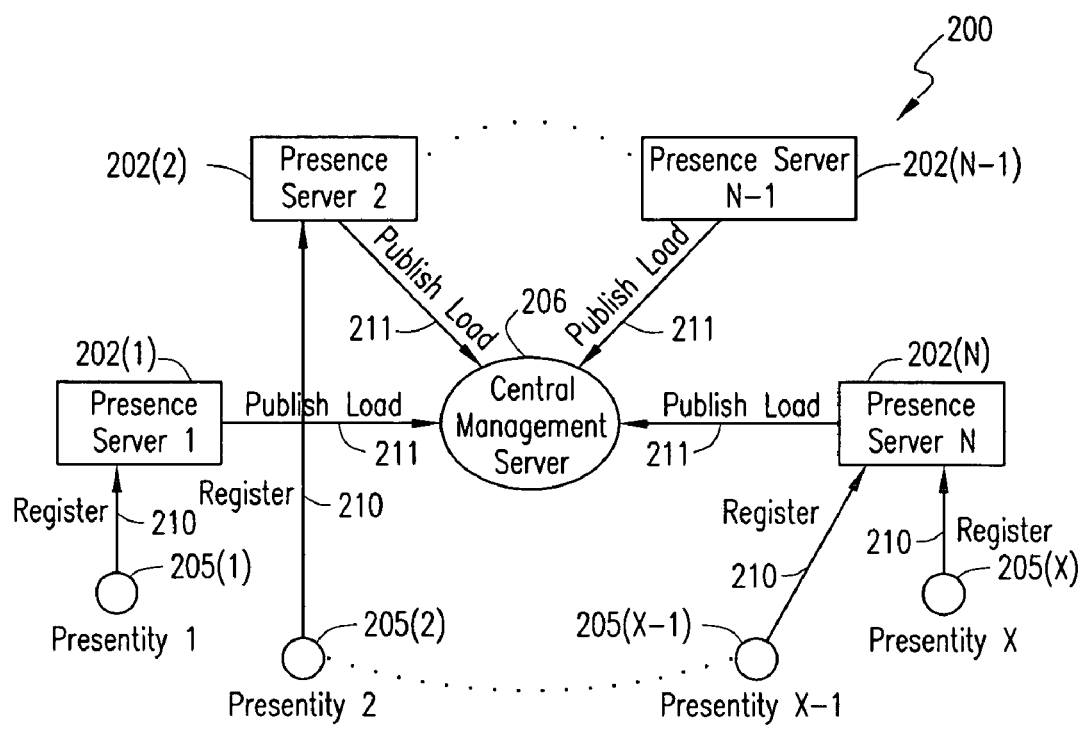
FIG. 2A illustrates a block diagram of a scalable presence distribution system in accordance with one embodiment.
Figure 2B:
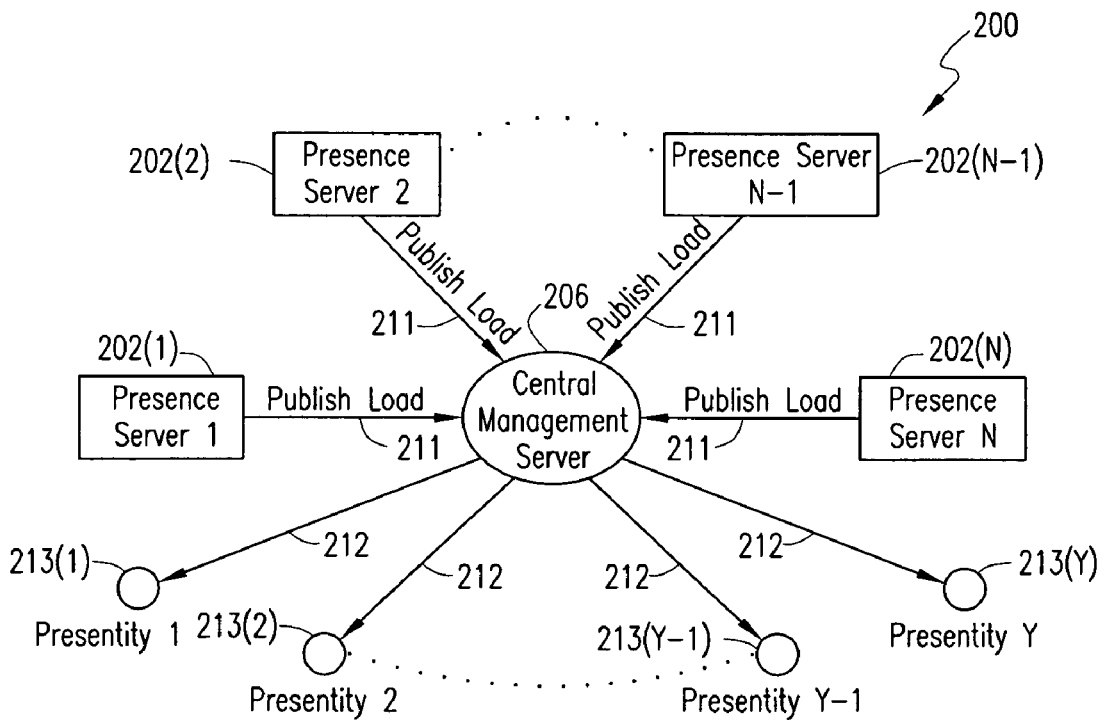
FIG. 2B illustrates distribution of presence server information to presentities of the system of FIG. 2A.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 2, depicted therein is scalable presence distribution system 200. The system 200 includes a plurality of presence servers 202(1)-202(N) and clients, or "presentities", 205(1)-205(X). In accordance with features of one embodiment, the system 200 further includes a Centralized management Server ("CMS") 206. In the system 200, existing presentities 205(1)-205(X) register at their home presence server 202(1)-202(N). For example, as illustrated in FIG. 2A, the presentity 205(1) registers with the presence server 202(1), the presentity 205(2) registers with the presence server 202(2), and the presentities 205(X-1) and 205(X) register with the presence server 202(N). Registration of each of the presentities with their respective servers is represented in FIG. 2A by arrows designated by a reference numeral 210. Additionally, in accordance with one embodiment, the distributed presence servers 202(1)-202(N) each publish their load (i.e., the number and identity of presentities registered therewith, as well as a watcher list for each presentity) to the CMS 206, as represented in FIG. 2A by arrows designated by a reference numeral 211. As represented in FIG. 2B by arrows designated by a reference numeral 212, the CMS 206 directs each of several new presentities 213(1)-213(Y) to register with an appropriate one of the presence servers 202(1)-202(N) based on the load distribution of the servers 202(1)-202(N) and routing criteria, such as proximity of the server to a watcher group of the particular presentity.

Figure 2C:
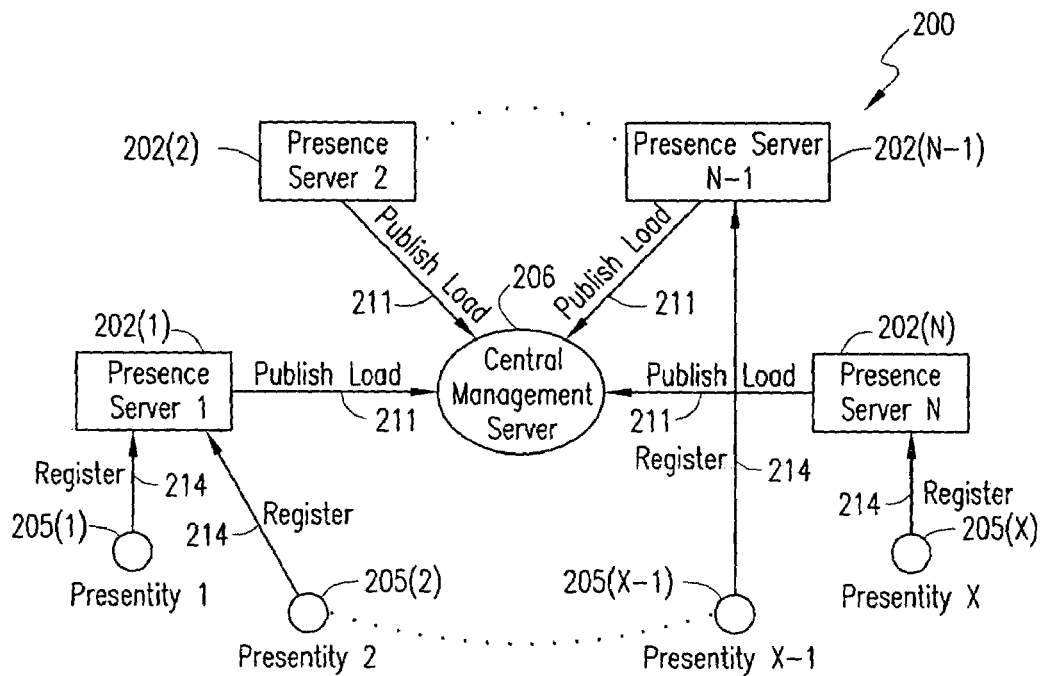
FIG. 2C illustrates registration of presentities with one or more presence servers in the system of FIG. 2A.

After receiving registration direction from the CMS 206, as illustrated in FIG. 2B, each of the new presentities 213(1)-213(Y) registers with the one of the presence servers 202(1)-202(N) as directed by the CMS 206, as represented in FIG. 2B by arrows designated by a reference numeral 214. For example, as illustrated in FIG. 2C, the presentity 213(1) registers with the presence server 202(1), the presentity 213(2) also registers with the presence server 202(1), the presentity 213(Y–1) registers with the presence server 202(N–1), and the presentity 213(Y) registers with the presence server 202(N).

Figure 2D:
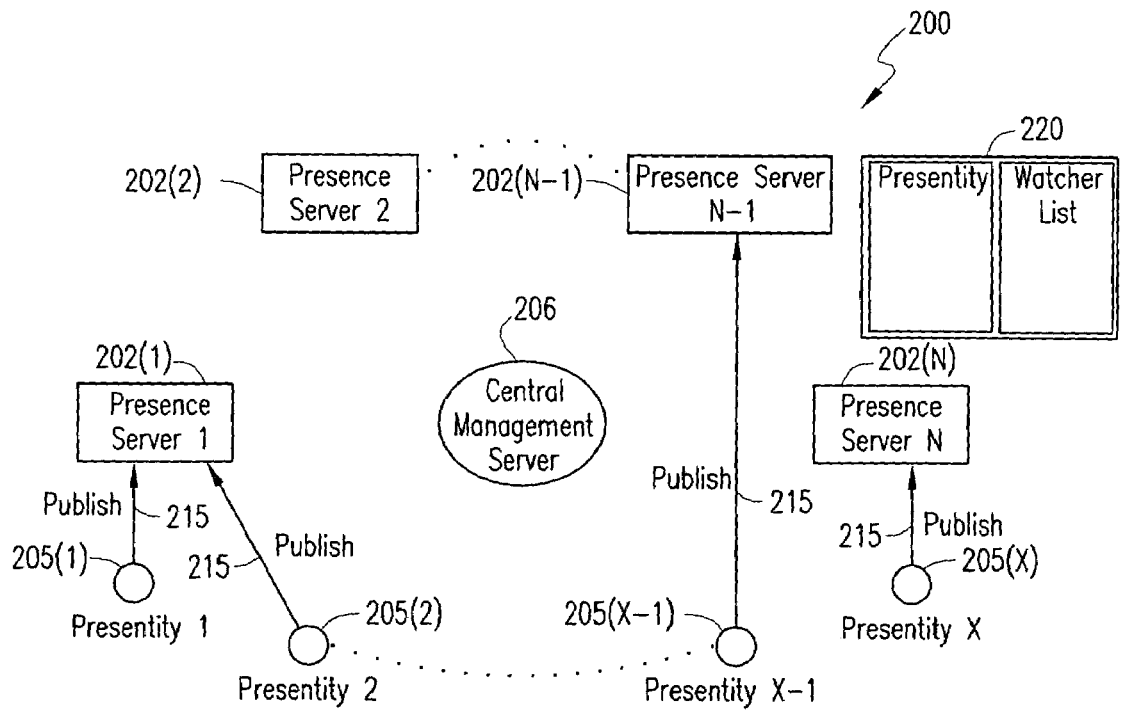
FIG. 2D illustrates maintenance of a table by a presence server indicating a watcher list and presence server address for each presentity registered therewith in the system of FIG. 2A.

As illustrated in FIG. 2D, each of the presence servers 202(1)-202(N) maintains a table that indicates, for each of the presentities 205(1)-205(X) registered therewith, a watcher list and a presence server address. As shown in FIG. 2D, a table 220 maintained by the presence server 202(N) will indicate a watcher list and presence server address for the presentity 205(X). Additionally, each of the presentities 205(1)-205(X) publishes its presence information to its respective presence server(s) 202(1)-202(N), as represented by arrows designated by a reference numeral 215.

Figure 2E:
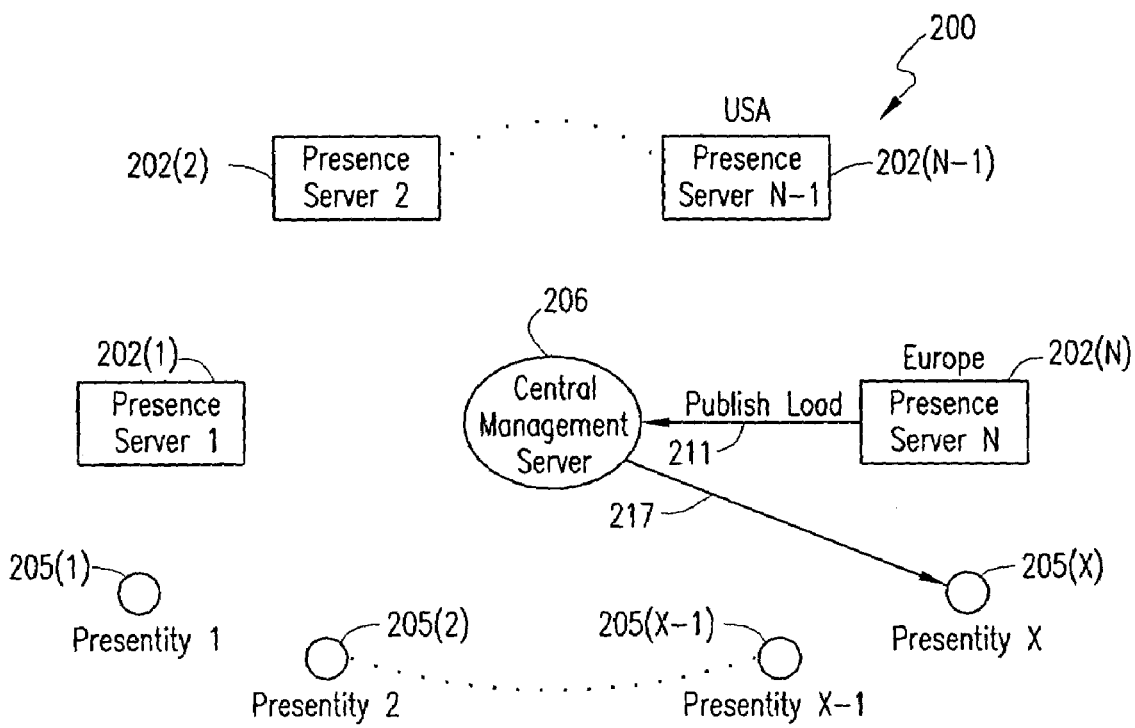
FIGS. 2E and 2F illustrate publication of presence information to multiple geographically separate presence servers in the system of FIG. 2A.

FIG. 2E illustrates a case in which presence information for a single presentity, e.g., the presentity 205(X), is published to multiple presence servers, e.g., the servers 202(N–1) and 202(N). This may be desirable if, for example, a presentity has a watcher group in two different geographic locations. In the example illustrated in FIG. 2E, the presentity 205(X), which has already with the presence server 202(N), located in Europe, has watcher groups in both Europe and in the United States. This information would be made known to the CMS 206 by a review of load information published to the CMS by the presence server 202(N), as represented by an arrow designated by a reference numeral 211.

In such a situation, it would be beneficial for the watchers in the United States to receive presence information regarding the presentity 205(X) from a United States-based presence server, e.g., the presence server 202(N–1). As shown in FIG. 2E, in this example, the presentity 205(X) is directed by the CMS 206 to register with the presence server 202(N–1), as illustrated by an arrow designated by a reference numeral 217.

Figure 2F:
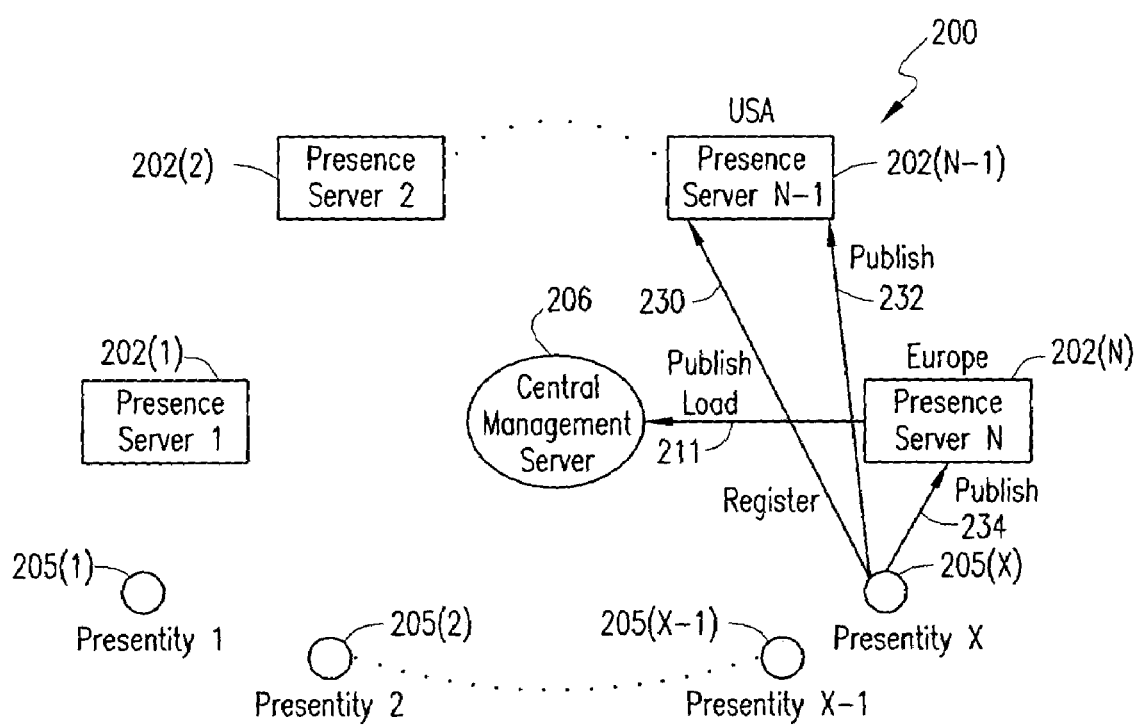

As illustrated in FIG. 2F, the presentity 205(X) registers with the presence server 202(N–1), as represented by an arrow 230, and then publishes its presence information to both the presence server 202(N–1) and the presence server 202(N), as represented by arrows 232 and 234, respectively.

Figure 2G:
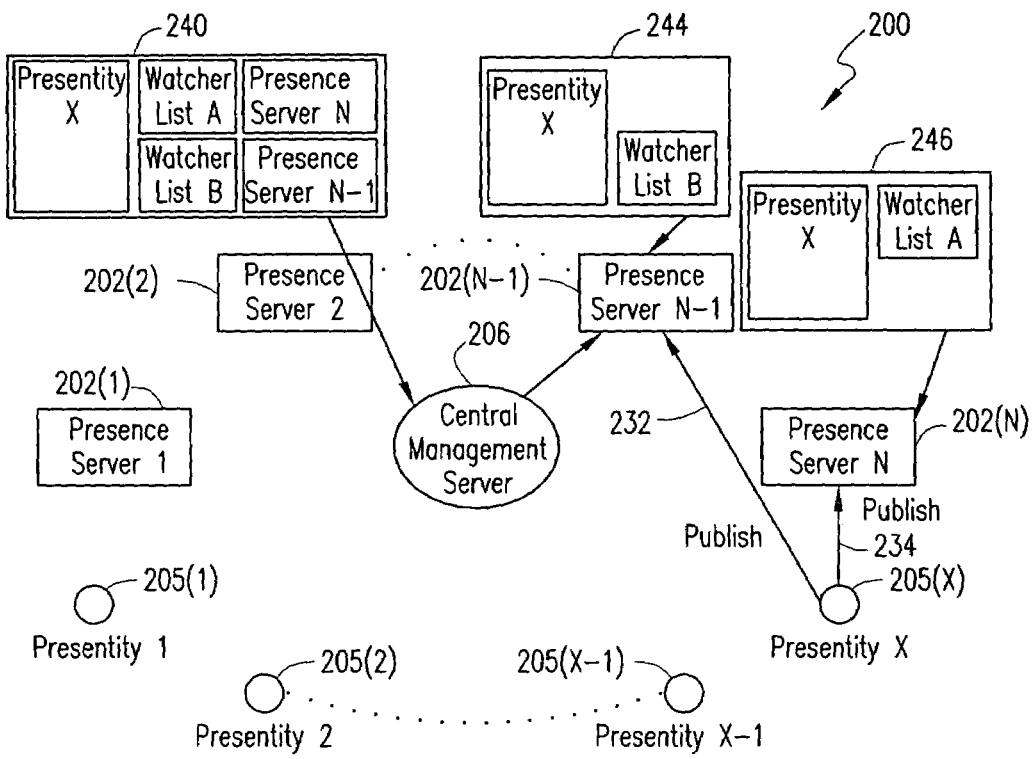
FIG. 2G illustrates updating of global and local tables maintained by a centralized management system and presence servers of the system of FIG. 2A.

As illustrated in FIG. 2G, the CMS 206 updates its own table 240 to indicate that watchers in a watcher list A, including a watcher 242(A) (FIG. 2H), receive presence information regarding the presentity 205(X) via the presence server 202(N) and to indicate that watchers in a watcher list B, including a watcher 242(B) (FIG. 2H), receive presence information regarding the presentity 205(X) via the presence server 202(N–1). Similarly, the presence servers 202(N–1) and 202(N) maintain their own tables 244, 246, respectively.

Figure 2H:
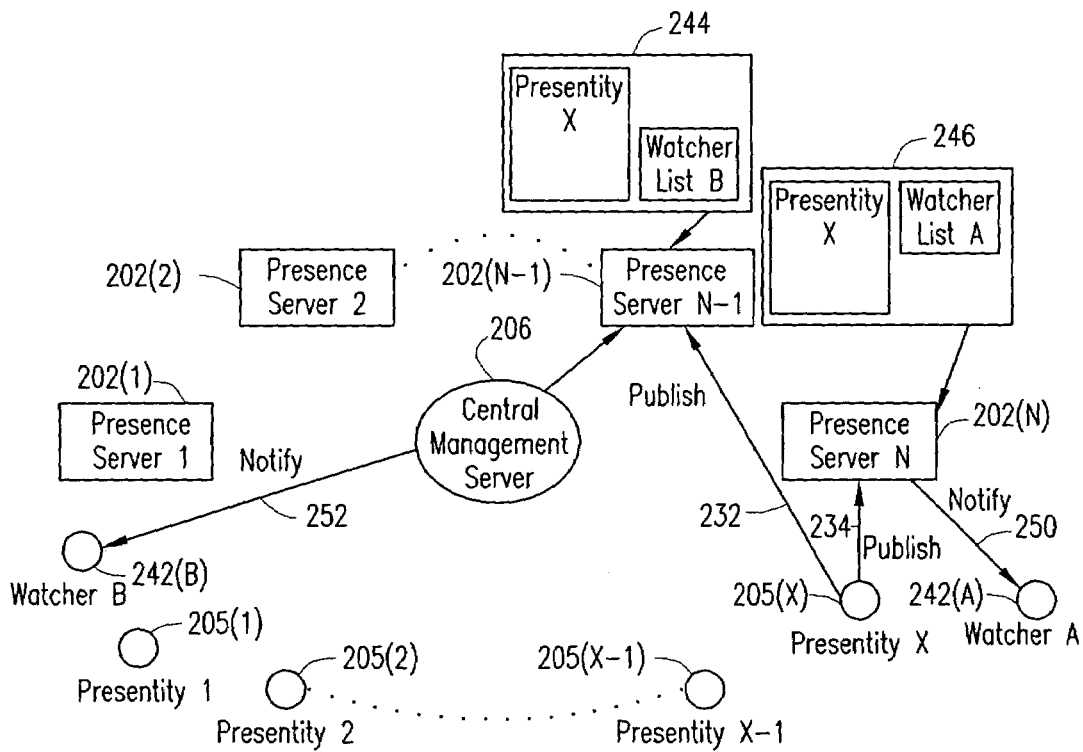
FIG. 2H illustrates notification of watchers by presence servers in the system of FIG. 2A.

As illustrated in FIG. 2H, and as set forth above, when the presentity 205(X) publishes presence information to the presence servers 202(N–1) and 202(N), as represented by the arrows 232, 234, the presence server 202(N) notifies the watcher 242(A), as represented by an arrow 250, and the presence server 202(N–1) notifies the watcher 242(B), as represented by an arrow 252.

Referring again to FIG. 2G, it will be recognized that the tables 244, 246, maintained by the presence servers 202(N–1) and 202(N), have a local view of things, while table 240 maintained by the CMS 206 has a global view; i.e., a view of the entire system 200.

Although it will be recognized that the above-described process may lead to duplication of presence information, there are situations in which the benefits of subscribing a watcher to a proximate presence server outweighs the cost of duplicating presentity subscriptions to more than one server. This may be the case, for example, when there is a large distance between watcher groups (e.g., one watcher group is in the USA and another is in Europe) or when the bandwidth between the networks is at a premium, such as in a branch office scenario or in a scenario involving local ISP versus backbone connection networks. Accordingly, as previously illustrated, a presentity with watchers groups in the USA and in Europe should communicate presence information to presences servers located in each of those countries, if possible. This can be achieved either through the presentity publishing directly to the servers or by the servers exchanging presence information via the CMS 206.

Figure 3:
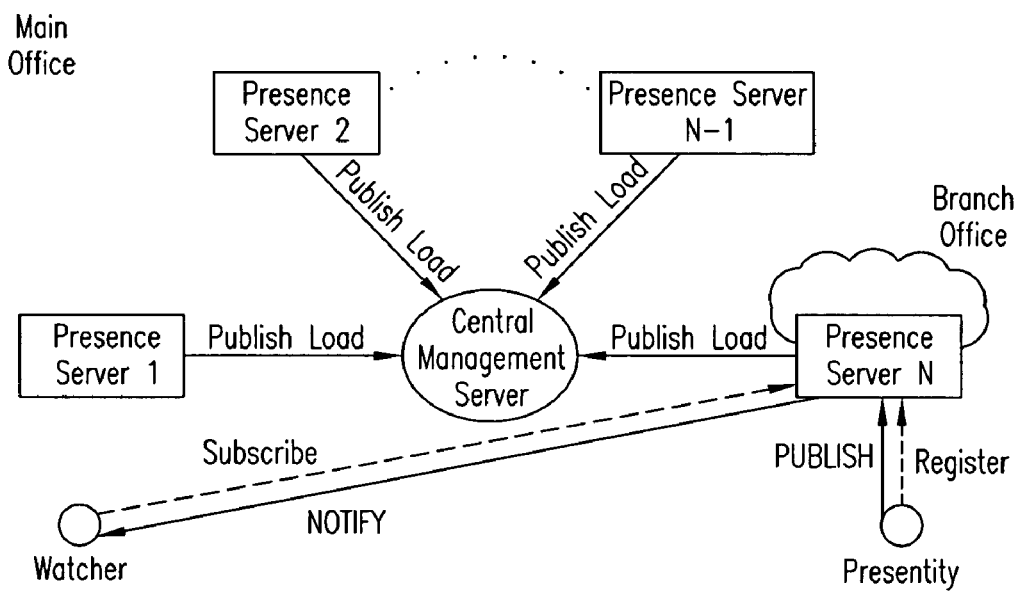
FIG. 3 illustrates a block diagram of a scalable presence distribution system for a main office/branch office scenario.

In a branch office scenario, a presentity with more than one watcher in any office (any branch or headquarters) would minimize the bandwidth of branch-headquarter links by publishing its presence updates to presence servers in each office, as illustrated in FIG. 3.

Similarly, in an ISP scenario, a presence server local to the ISP network would server watchers in the same ISP, which may be predominant in certain collocated social groups, such as school or work colleagues, and publish presence updates to presence server watchers that are out-of-network.

The CMS 206 can be used to download important company-wide policies on proper presence information usage to each presence server. More importantly, the CMS 206 can support roaming by users across different presence servers. The attachment of a presentity to another presence server due to user roaming or load balancing can be made to be detected by the CMS 206. For example, if a presentity in Europe has many watchers in the USA, which leads the presentity to publish its presence information on a second presence server in the USA. Upon detection, an association can be made between the presentity's old and new addresses, which can be maintained in the CMS 206. This will enable a presentity to receive subscription of others presence information in the new address while updating its presence information in the address for the watchers.

Figure 4:
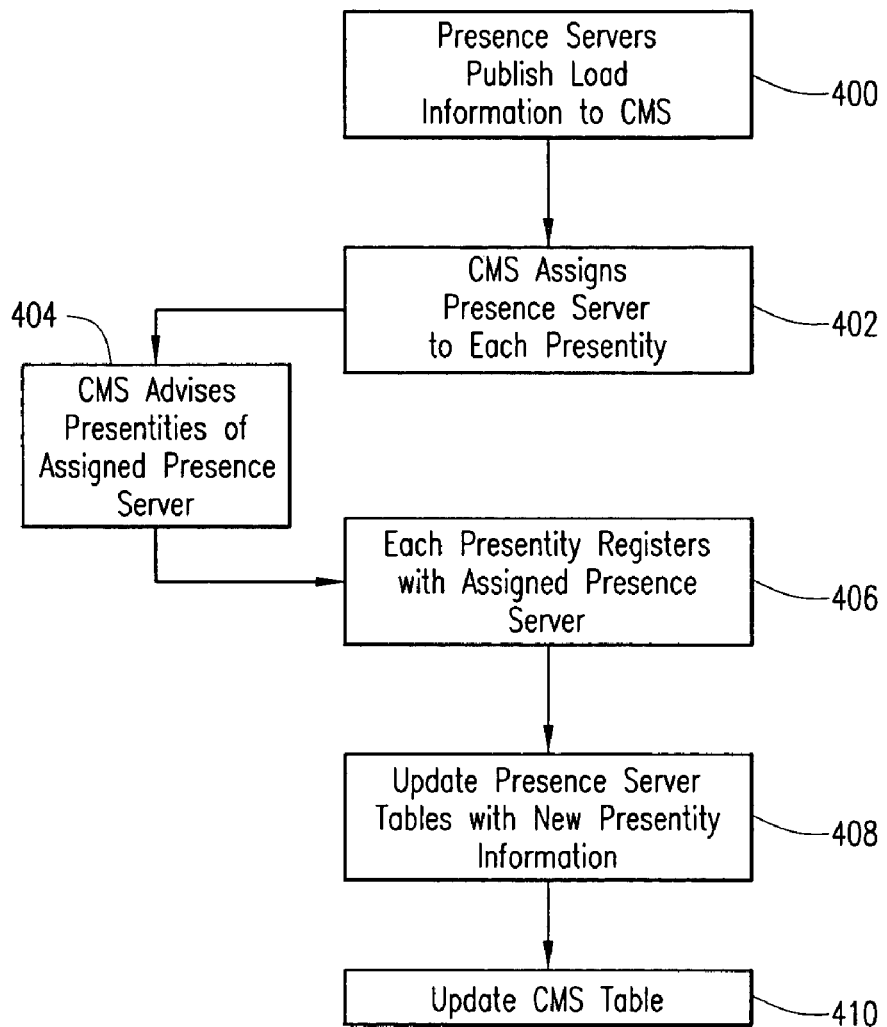
FIG. 4 is a flowchart of the operation of the embodiment illustrated in FIGS. 2A-2H.

FIG. 4 is a flowchart of the operation of the system 200 of FIGS. 2A-2H. In step 400, each of the presence servers 202(1)-202(N) publishes its load information to the CMS 206. This step is illustrated in FIG. 2A. In step 402, the CMS 206 takes the load information published thereto and assigns a presence server to each of the registered presentities 205(1)-205(X). As indicated above, this assignment can be made based on load balancing, geographic, and other considerations. In step 404, the CMS 206 advises each of the registered presentities 205(1)-205(X) of its assigned server as determined in step 402. This step is illustrated in FIG. 2B.

In step 406, each of the presentities 205(1)-205(X) registers with its assigned presence server. This step is illustrated in FIG. 2C. In step 408, a table maintained by each presence server 202(1)-202(N) is updated at that server to include any presentities that have newly registered therewith (i.e., in step 406). As previously noted, this table includes, for each presentity registered with the presence server, a watcher list of all of the watchers that subscribe to the presentity. In step 410, a table maintained by the CMS 206 is updated such that it includes information on all of the presentities, including for each presentity an indication of the presence server(s) with which it is registered and a watcher list corresponding to each presence server with which it is registered. This is illustrated in FIG. 2G.

Accordingly, the embodiments described herein provide a scalable presence distribution system. It will be recognized that, although the embodiments have been described as being implemented using a centralized management system 206, the function performed by the CMS 206 may be distributed among the multiple presence servers and need not reside in a separate, designated server.

It should be noted that, although the embodiments have been described with reference to SIP, other protocols may be appropriate for use with the embodiments. Moreover, it will be recognized that subscription to selected presentities will be performed in accordance with the selected protocol.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A presence distribution system comprising:
   a plurality of presence servers; and
   a centralized management function for coordinating registration of a presentity with multiple ones of the plurality of presence servers to register the presentity on two or more of the plurality of presence servers to enable the presentity to publish presence information of the presentity to the two or more presence servers for use by the two or more presence servers in coordinating dissemination of the presence information to watchers of the presentity;
   wherein the watchers are entities that subscribe to the presence servers to receive the presence information of the presentity;
   wherein the centralized management function directs the presentity to register with one of the plurality of presence servers based on a geographic location of a watcher of the presentity and a geographic location of each of the plurality of presence server; and
   wherein the centralized management function comprises a table including a list of registered presentities that publish presence information to any one of the plurality of presence servers and, for each of the registered presentities, a watcher list for the presentity and an address of the presence server with which the presentity is registered with respect to the watcher list.

2. The system of claim 1 wherein each presence server comprises a table including a list of registered presentities that publish presence information to the presence server and a watcher list for each of the registered presentities.

3. The system of claim 2 wherein the table further comprises an address of the presence server.

4. The system of claim 1 wherein the plurality of presence servers publish load information to the centralized management function.

5. The system of claim 4 wherein the centralized management function performs load balancing among the plurality of presence servers by directing a presentity to register with one or more of the plurality of presence servers based on the published load information.

6. The system of claim 1 wherein the centralized management function is implemented by a designated centralized management server.

7. The system of claim 1 wherein the centralized management function is implemented by a combination of one or more of the plurality of presence servers.

8. A method of implementing a presence distribution system, the method comprising:
   receiving load information from a plurality of presence servers;
   for each presentity registered with one of the plurality of presence server, identifying one or more additional ones of the plurality of presence servers with which the presentity should register based on a geographic location of a watcher of the presentity and a geographic location of each of the plurality of presence servers, the watcher being an entity that subscribes to at least one of the presence servers to receive the presence information of the presentity; and
   for each presentity registered with one of the plurality of presence servers, directing the presentity to register with the identified one or more additional presence servers to enable the presentity to publish presence information of the presentity to the one or more additional presence servers for use by the two or more presence servers in coordinating dissemination of the presence information to watchers of the presentity; and
   maintaining a centralized management function table including a list of registered presentities that publish presence information to any one of the plurality of presence servers and, for each of the registered presentities, a watcher list for the presentity and an address of the presence server with which the presentity is registered with respect to the watcher list.

9. The method of claim 8 further comprising maintaining at each presence server a table including a list of registered presentities that publish presence information to the presence server and a watcher list and presence server address for each of the registered presentities.

10. The method of claim 9 further comprising, for each presence server, updating the table maintained by the presence server to include any newly registered presentities.

11. The method of claim 8 further comprising updating the table maintained by the centralized management function to include information for new presentity registrations.

12. The method of claim 8 wherein the identifying comprises using the received load information to perform load balancing among the plurality of presence servers.

13. A presence distribution system comprising:
    means for receiving load information from a plurality of presence servers;
    means for identifying, for each presentity registered with one of the plurality of presence servers, one or more additional ones of the plurality of presence servers with which the presentity should register based on a geographic location of a watcher of the presentity and geographic location of each of the plurality of presence servers, the watcher being an entity that subscribes to at least one of the presence servers to receive the presence information of the presentity; and
    means for directing each presentity registered with one of the plurality of presence servers to register with the identified one or more additional presence servers to enable the presentity to publish presence information of the presentity to the two or more presence servers for use by the two or more presence servers in coordinating dissemination of the presence information to watchers of the presentity; and
    a centralized management function table including a list of registered presentities that publish presence information to any one of the plurality of presence servers and, for each of the registered presentities, a watcher list for the presentity and an address of the presence server with which the presentity is registered with respect to the watcher list.

14. The system of claim 13 wherein each presence server includes a table including a list of registered presentities that publish presence information to the presence server and a watcher list and presence server address for each of the registered presentities.

15. The system of claim 14 further comprising, for each presence server, means for updating the table maintained by the presence server to include any newly registered presentities.

16. The system of claim 13 further comprising means for updating the centralized management function table to include information for new presentity registrations.

17. The system of claim 13 wherein the means for identifying comprises a centralized management function, wherein the centralized management function uses the received load information to perform load balancing among the plurality of presence servers.

* * * * *